United States Patent [19]

Patel

[11] Patent Number: 5,642,900
[45] Date of Patent: Jul. 1, 1997

[54] AIR BAG ATTACHMENT TO MODULE

[75] Inventor: Muklesh Chunibhai Patel, Bellbrook, Ohio

[73] Assignee: General Motors Corporation, Detroit, Mich.

[21] Appl. No.: 551,271

[22] Filed: Oct. 31, 1995

[51] Int. Cl.$^6$ .................................................. B60R 21/16
[52] U.S. Cl. .................... 280/728.2; 280/743.1; 83/29; 112/475.08
[58] Field of Search ................ 280/828.2, 743.1, 280/731, 732, 730.1, 728.1, 736, 741; 83/29; 112/475.08, 130

[56] References Cited

U.S. PATENT DOCUMENTS

| | | | |
|---|---|---|---|
| 4,988,119 | 1/1991 | Hartmeyer | 280/728.2 |
| 5,074,584 | 12/1991 | Jarboe | 280/728.2 |
| 5,131,677 | 7/1992 | Horiuchi et al. | 280/731 |
| 5,149,130 | 9/1992 | Wooley et al. | 280/743.1 |
| 5,205,584 | 4/1993 | Honda | 280/743.2 |
| 5,226,671 | 7/1993 | Hill | 280/743.1 |
| 5,263,738 | 11/1993 | Oda et al. | 280/728.2 |
| 5,308,109 | 5/1994 | Igwawa | 280/728.2 |
| 5,308,110 | 5/1994 | Kokeguchi | 280/728.2 |
| 5,409,256 | 4/1995 | Gordon et al. | 280/728.2 |
| 5,460,408 | 10/1995 | Conley, Jr. | 83/29 |
| 5,509,685 | 4/1996 | Boyle, III | 280/728.2 |

FOREIGN PATENT DOCUMENTS

| | | | |
|---|---|---|---|
| 4317740 | 12/1993 | Germany | 280/728.2 |
| 3-153438 | 7/1991 | Japan | 280/728.2 |
| 3-292236 | 12/1991 | Japan | 280/743.1 |
| 5-294202 | 11/1993 | Japan | 280/731 |

*Primary Examiner*—Brian L. Johnson
*Assistant Examiner*—Peter C. English
*Attorney, Agent, or Firm*—Kathryn A. Marra

[57] ABSTRACT

An air bag module includes a base plate and an inflator mounted to the base plate. The inflator discharges inflator gas to inflate an air bag. The air bag includes an air bag opening for receiving inflator gas therethrough. The air bag is made of a flexible fabric air bag material. The air bag also includes a mouth portion surrounding the air bag opening. The mouth portion includes a plurality of flap portions. Each of the flap portions is a continuous extension of the air bag material and each of the flap portions is connected to the base plate to anchor the air bag during air bag deployment. The flap portions cooperatively define the shape of the air bag opening and are each formed by cutting the air bag material to form the air bag opening.

8 Claims, 3 Drawing Sheets

AIR BAG ATTACHMENT TO MODULE

This invention relates to a vehicle air bag module, and more particularly to an air bag module having an improved structure and method for attaching the air bag to the module.

BACKGROUND OF THE INVENTION

It is well known in motor vehicles to provide an air bag module mounted to a vehicle steering wheel. A typical driver's side air bag module includes a base plate having a central base plate opening and an inflator mounted to the base plate and partially extending up through the base plate opening. The module also typically includes an air bag having an air bag opening for receiving discharging inflator gas therein to inflate the air bag upon the occurrence of certain predetermined vehicle conditions. The air bag opening is typically cut out of the air bag and the scrap material is thrown away. The air bag includes a mouth portion surrounding the air bag opening. An air bag retainer which is typically an apertured metal plate or other structural component is attached to the mouth portion of the air bag by a set of fasteners to strengthen the mouth portion for attachment to the module. The air bag and air bag retainer are typically attached to an upper surface of the base plate by another set of fasteners. The mouth portion of the air bag is typically captured between the base plate and the air bag retainer. The inflator typically includes an inflator flange which is attached to the bottom surface of the base plate by yet another set of fasteners.

The prior art air bag modules have the shortcoming of requiring a structural metal or plastic air bag retainer to attach the mouth portion of the air bag to the base plate of the module. In addition, prior art modules also have the shortcoming of requiring one or more sets of fasteners to attach the air bag to the air bag retainer and also to attach the air bag retainer and air bag to the base plate of the module. The use of an air bag retainer and associated fasteners to attach the air bag to the base plate of the module adds time, weight, and cost to the manufacturing and assembly of the module. However, the prior art has recognized that the air bag retainer and fasteners are necessary components when the air bag has an air bag opening with a mouth portion attached to the base plate. The air bag retainer and fasteners are required so that the fabric air bag material of the mouth portion is sufficiently reinforced and anchored so that the air bag does not tear or release from the base structure of the module during air bag deployment.

SUMMARY OF THE INVENTION

This invention solves the shortcomings of the prior art by providing an air bag module which completely eliminates any type of structural air bag retainer and additional fasteners needed to attach the air bag to the air bag retainer. Instead, the flexible fabric air bag material which is normally thrown away as scrap when making the air bag is utilized to attach the air bag to the base plate of the module. The air bag material is attached directly to the base plate of the module to which the inflator is also attached. Advantageously, the same fasteners may be used to attach both the air bag and inflator to the base plate. Thus, the mass and cost of the module are reduced and the module is easier to assemble and manufacture. Advantageously, the fabric material provides sufficient support and reinforcement to the mouth portion of the air bag, thus reducing the mass of the module and eliminating complex retainers and fasteners.

These advantages are accomplished in the present invention by providing an air bag module having a base plate and an inflator mounted to the base plate. The inflator discharges inflator gas to inflate an air bag. The air bag includes an air bag opening for receiving inflator gas therethrough. The air bag is made of a flexible fabric air bag material. The air bag also includes a mouth portion surrounding the air bag opening. The mouth portion includes a plurality of flap portions. Each of the flap portions is a continuous extension of the air bag material and each of the flap portions is connected to the base plate to anchor the air bag during air bag deployment. The flap portions cooperatively define the shape of the air bag opening. Preferably, each of the flap portions has a triangular shape and the flap portions are each formed by cutting the air bag material to form the air bag opening. A seam is preferably sewn around the perimeter of each of the flap portions. Advantageously, a plurality of base plate fasteners may be used to attach both the inflator and the flap portions to the base plate. Also advantageously, the flap portions are captured between the base plate and the inflator, instead of between the base plate and an extra air bag retainer as in the prior art.

In accordance with another aspect of this invention, the base plate has a base plate opening, an upper surface and an opposite bottom surface. The air bag has an inflatable main body portion positioned atop the upper surface of the base plate. The flap portions extend through the base plate opening and are attached to the bottom surface of the base plate.

In accordance with yet another aspect of this invention, the air bag is attached to the module by providing an air bag made of a flexible fabric air bag material; cutting the air bag material into flap portions which cooperatively form the shape of an air bag opening for receiving inflator gas of an inflator therethrough; folding back the flap portions to open the air bag opening; and fastening the flap portions to the module. Additionally, the air bag may be cut into the flap portions by cutting at least two intersecting linear cuts in the air bag material to form the flap portions. Furthermore, the module may be provided with a base plate and the inflator provided with an outwardly extending inflator flange. The flap portions are inserted between the base plate and the inflator flange and the flap portions and inflator flange are fastened to the base plate to form the module.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
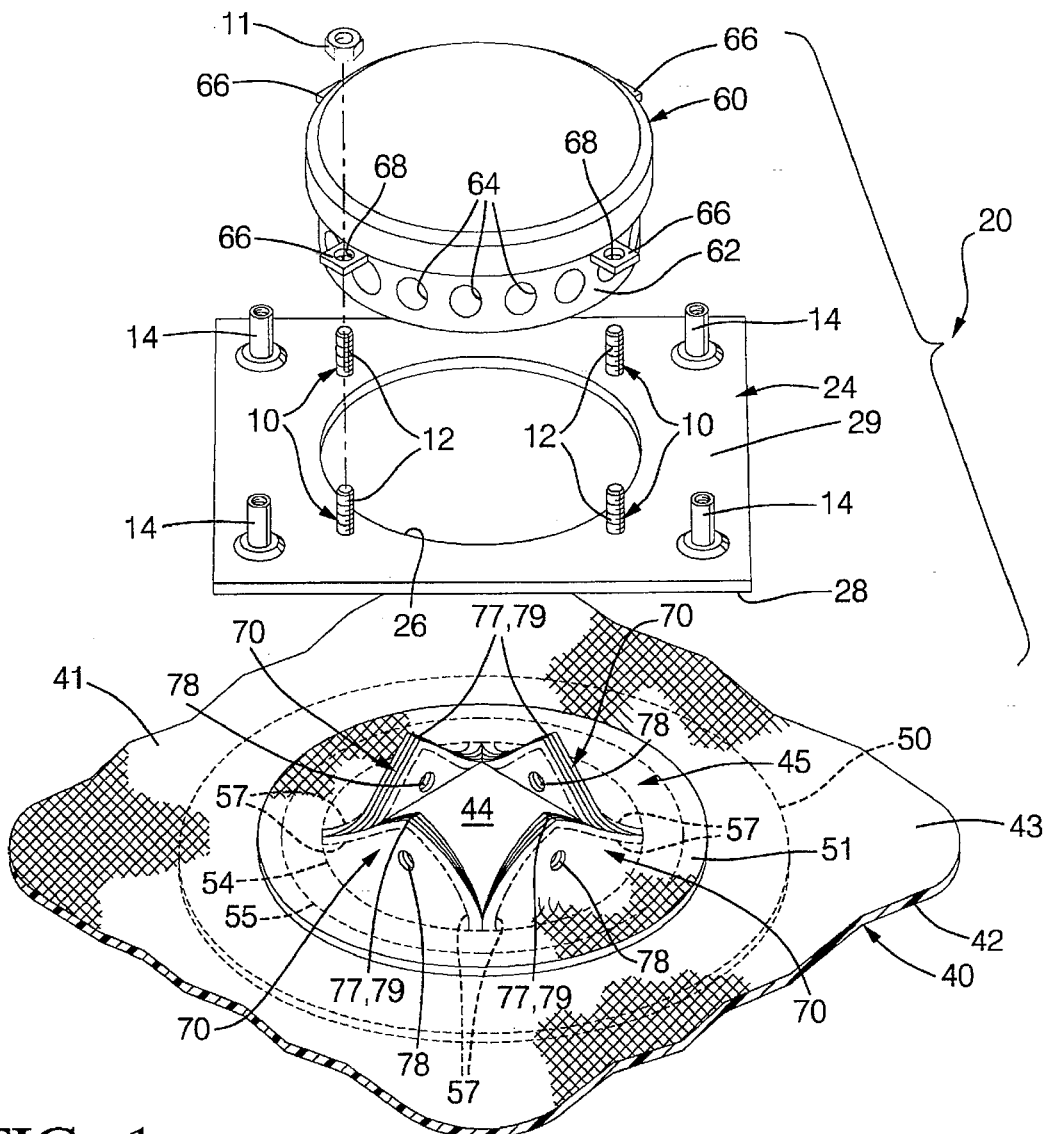
FIG. 1 shows an exploded perspective view of an air bag module with the air bag partially-broken-away.

Referring to FIG. 1, the driver's side air bag module is generally designated as 20. The component parts of the module 20 include a base plate 24, an air bag 40, an inflator 60, and fasteners 10. The air bag 40, inflator 60, and fasteners 10 are each attached to the base plate 24 to provide the module 20. The module 20 is conventionally assembled to a hub portion of a vehicle steering wheel (not shown). It will be appreciated that the module 20 is shown inverted in FIG. 1 for clarity of the assembly process, described further hereinafter.

The base plate 24 is preferably a planar, metallic, rectangular-shaped plate having a central circular base plate opening 26 sized slightly larger than an upper outlet portion 62 of the inflator 60. The base plate 24 includes an upper surface 28 and an opposite bottom surface 29. A plurality of fasteners 10, such as bolts, are disposed on the base plate 24 and shank portions 12 of the fasteners 10 extend downwardly away from the bottom surface 29 of the base plate 24. The bottom surface 29 of the base plate 24 may further include a plurality of downwardly extending, internally threaded tubular members 14 for receiving bolts (not shown) to attach the module 20 to the hub portion of the steering wheel.

The module 20 includes the inflator 60 for discharging inflator gas in an upwardly direction to inflate the air bag 40 when the inflator 60 receives a predetermined signal from a vehicle sensor, not shown. The inflator 60 has a generally circular shape and may be of any conventional construction for discharging gas such as through ports 64 in the upper outlet portion 62 to inflate the air bag 40. The inflator 60 includes a discontinuous inflator flange 66 being a plurality of tabs extending outwardly from the inflator 60 and located below the upper outlet portion 62 of the inflator 60. The inflator flange 66 includes spaced apart flange apertures 68 aligned for receiving the corresponding fasteners 10 of the base plate 24 therethrough. In the assembled condition shown in FIG. 2, the inflator 60 is centrally positioned within the base plate opening 26 and extends partially therethrough. The upper outlet portion 62 of the inflator 60 extends upwardly away from the upper surface 28 of the base plate 24 and into the air bag 40. The inflator flange 66 limits insertion of the inflator 60 through the base plate opening 26 and is positioned adjacent the bottom surface 29 of the base plate 24 for attachment thereto preferably via the fasteners 10. It will be appreciated, however, that the inflator 60 may be mounted to the base plate 24 in any suitable manner.

Figure 2:
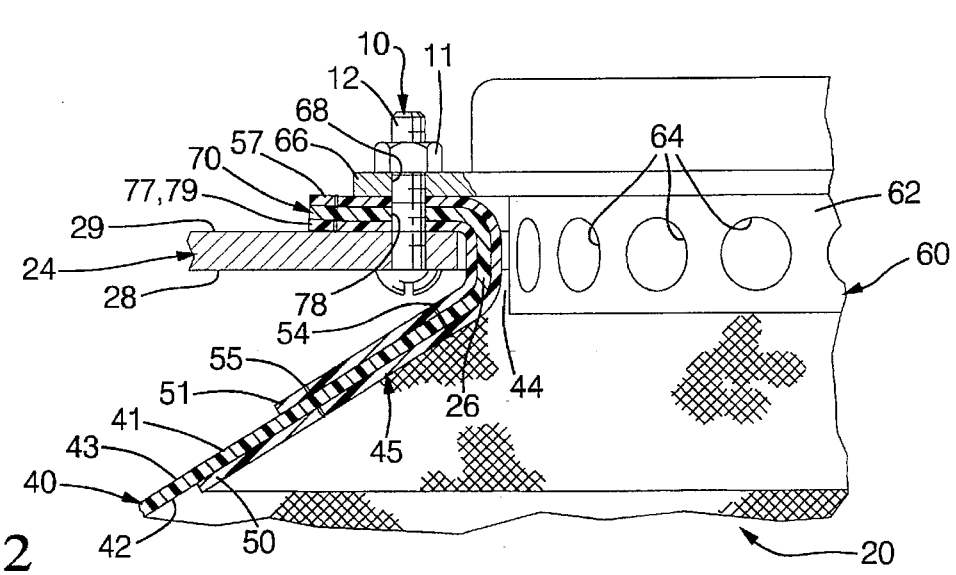
FIG. 2 shows an assembled view of the air bag module partially-broken-away.

Referring to FIGS. 1–3D, the air bag 40 is made of a conventional flexible fabric air bag material. The air bag 40 includes an interior side 42 and an opposite exterior side 43. The air bag 40 includes a generally circular air bag opening 44 surrounded by a mouth portion 45. The air bag 40 is mounted to the module 20 via the mouth portion 45 of the air bag 40. The air bag opening 44 is sized slightly larger than the upper outlet portion 62 of the inflator 60 and the upper outlet portion 62 of the inflator 60 projects upwardly into the air bag opening 44 in the assembled condition as shown in FIG. 2. The air bag 40 includes an inflatable main body portion 41, shown broken-away in FIGS. 1–3D, which is normally stored in a folded condition atop the inflator 60 and atop the upper surface 28 of the base plate 24.

The air bag material which is cut to form the air bag opening 44 is not scrapped, but instead remains part of the mouth portion 45 of the air bag 40 and is utilized to securely attach the air bag 40 to the module 20, as will now be described. The mouth portion 45 of the air bag 40 includes a plurality of flap portions 70 formed by cutting the air bag material to form the air bag opening 44, as described in detail further hereinafter. The flap portions 70 each extend radially inward from the air bag opening 44 of the air bag 40 prior to attachment to the base plate 24 of the module 20. The flap portions 70 are each directly attached to the bottom surface 29 of the base plate 24 to anchor the air bag 40 to the module 20 during air bag deployment. The flap portions 70 are each a continuous extension of the air bag material to provide a secure anchor between the air bag 40 and the base plate 24.

Figure 3A:
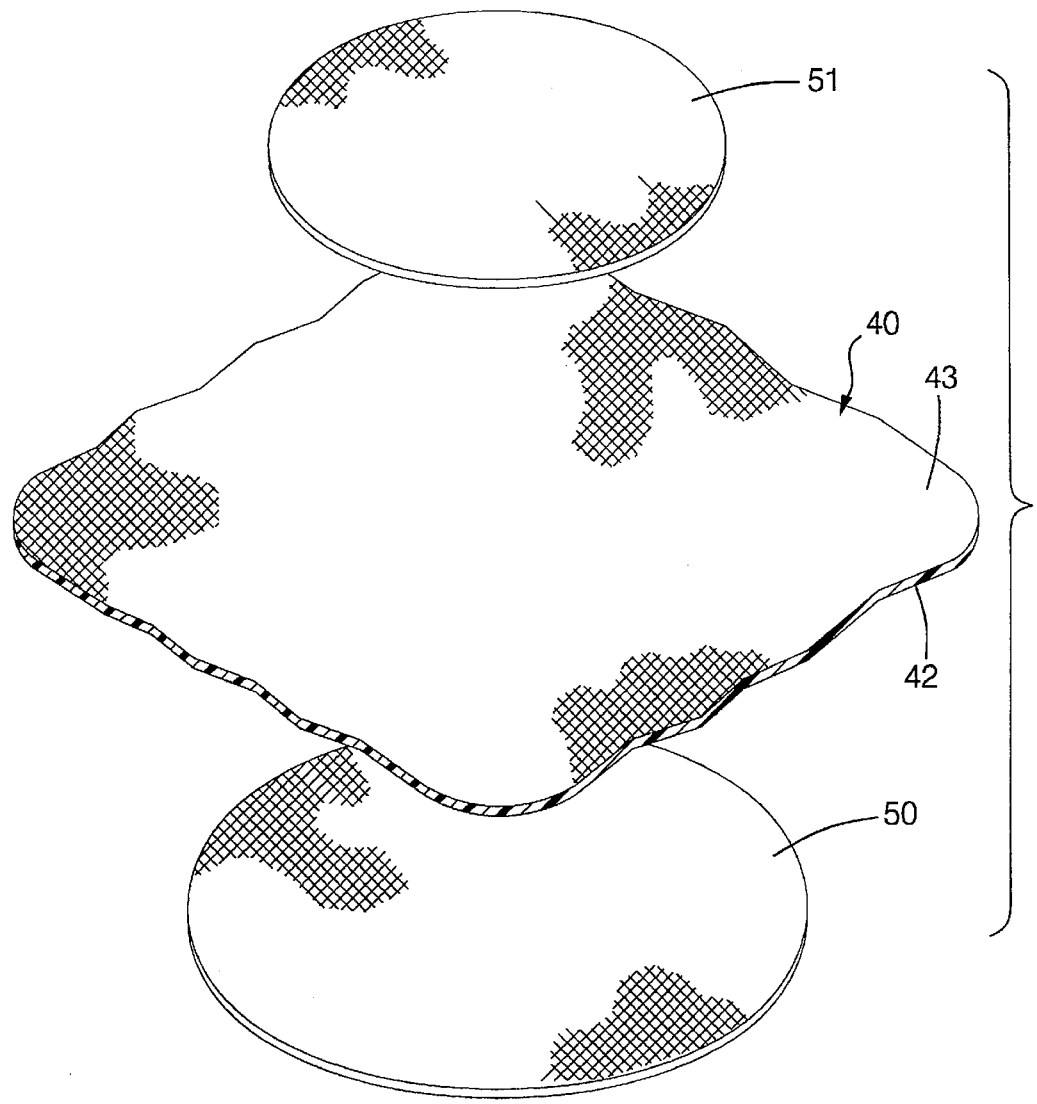
FIG. 3A shows an exploded perspective view of the air bag including the interior and exterior reinforcement patch layers.
Figure 3B:
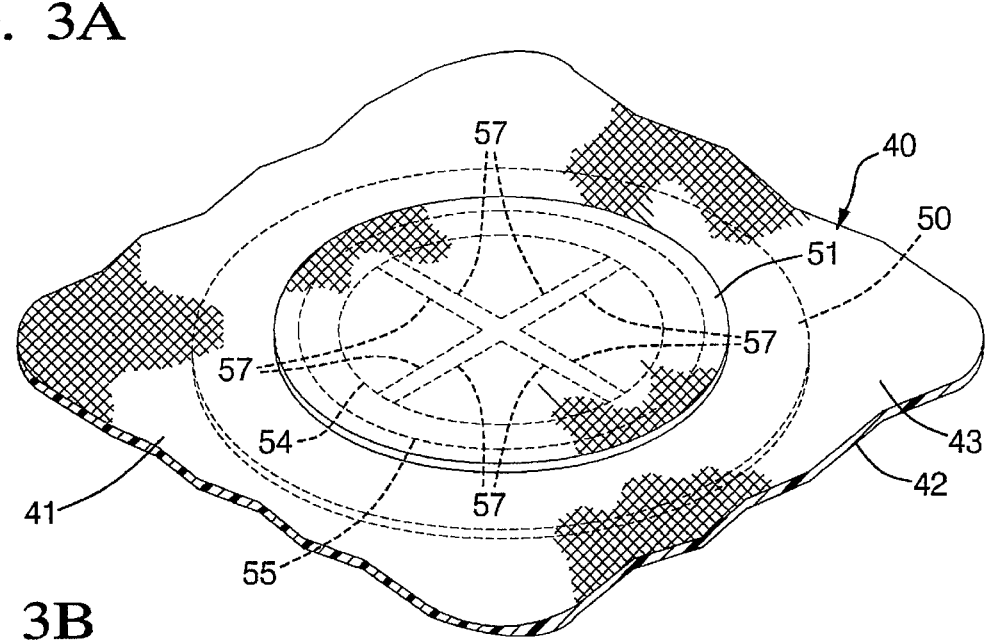
FIG. 3B shows an assembled view of the air bag and reinforcement patch layers prior to cutting the air bag opening.
Figure 3C:
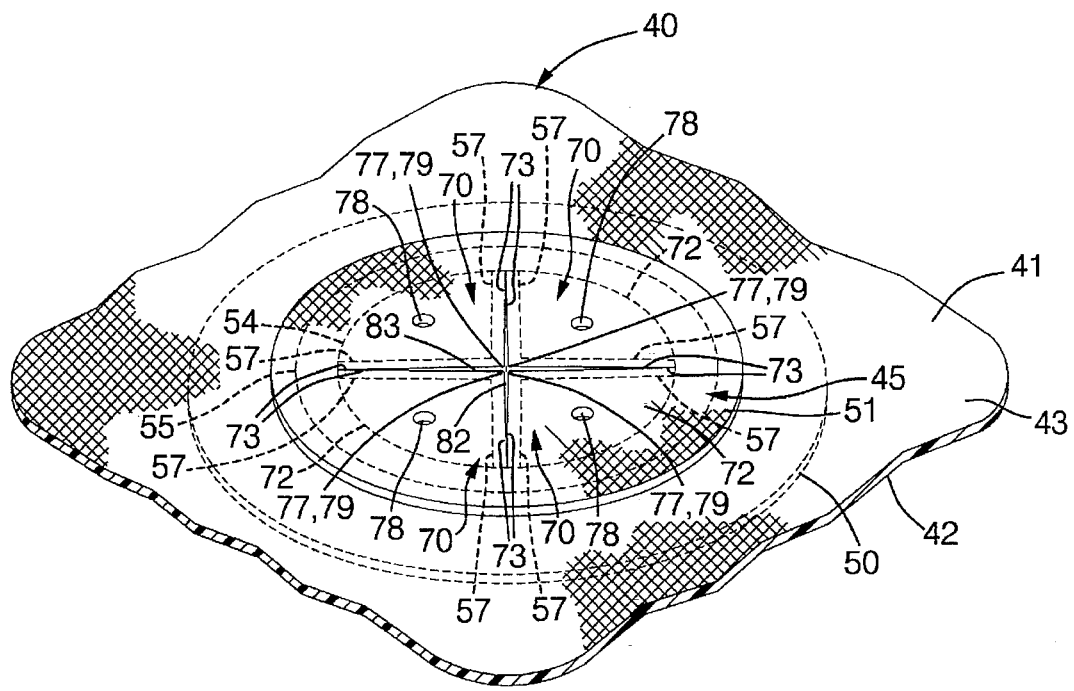
FIG. 3C shows a perspective view of the air bag including the cuts forming the air bag opening and the flap portions.

The flap portions 70 each preferably have a triangular shape and each include a first edge 72 continuous with the air bag material and a pair of free edges 73. The flap portions 70 each include a tip portion 77 having a flap aperture 78 therethrough aligned for receiving the corresponding fasteners 10 of the base plate 24 therethrough during assembly to attach the flap portions 70 to the bottom surface 29 of the base plate 24. As best shown in FIG. 3C, the flap portions 70 cooperatively form the circular shape of the air bag opening 44. Also, the flap portions 70 each include a free tip point 79 all of which intersect at the center of the air bag opening 44 prior to attachment to the base plate 24 as best shown in FIG. 3C.

The air bag material forming the flap portions 70 would normally be cut out and thrown away as scrap during the process of making the air bag 40 or possibly be used to form a hem portion to hold an air bag retainer. Instead, this normally scrapped material becomes an effective structure for directly mounting the air bag 40 to the base plate 24 without the use of a separate air bag retainer.

The mouth portion 45 of the air bag 40 preferably also includes an interior reinforcement patch layer 50 attached to and congruent with the interior side 42 of the air bag 40 and an exterior reinforcement patch layer 51 attached to and congruent with the exterior side 43 of the air bag 40. The reinforcement patch layers 50, 51 are preferably made of a flexible fabric material which may be the same material as the air bag 40 or preferably is a heat resistant fabric material to withstand the heat generated by the discharging inflator 60. The reinforcement patch layers 50, 51 are each preferably a circular-shaped patch sized larger than the air bag opening 44 so that the reinforcement patch layers 50, 51 continuously extend radially outward from the flap portions 70 and air bag opening 44 to provide outer margins of fabric surrounding the air bag opening 44. The interior reinforcement patch layer 50 is shown as being larger than the exterior reinforcement patch layer 51, but this is not necessary. Circular inner and outer seams 54, 55 are preferably sewn around the circumference of the reinforcement patch layers 50, 51 to attach the reinforcement patch layers 50, 51 to the air bag material. The inner seam 54 is preferably sewn to outline the shape of the air bag opening 44 on the air bag 40. Edge seams 57 are preferably sewn along the free edges 73 of each of the flap portions 70 through both the air bag 40 and the reinforcement patch layers 50, 51 to prevent separation of the air bag material from the reinforcement patch layers 50, 51 and to strengthen the free edges 73 of the flap portions 70. It will be appreciated that the inner seam 54 and the edge seams 57 cooperatively provide sewn seams around the perimeters of each of the flap portions 70 to hold the layers of material together and to strengthen the flap portions 70.

The air bag 40 is preferably formed in the following manner with reference to FIGS. 3A to 3D. The air bag 40 is originally provided as an integral piece of flexible fabric air bag material as shown in FIG. 3A. The interior reinforcement patch layer 50 and the exterior reinforcement patch layer 51 are each placed congruent to the interior and exterior sides 42, 43, respectively, of the air bag 40 at the predetermined location of the air bag opening 44. The reinforcement layers 50, 51 are attached to the air bag by sewing the inner and outer seams 54, 55. The inner seam 54 is sewn to outline the circular shape of the air bag opening 44. Next, the edge seams 57 are sewn so that they outline the triangular shape of each of the flap portions 70 as shown in FIG. 3B. Referring to FIG. 3C, the air bag 40 is provided with the flap apertures 78 by punching out the air bag material on the tip portion 77 of the flap portions 70.

Figure 3D:
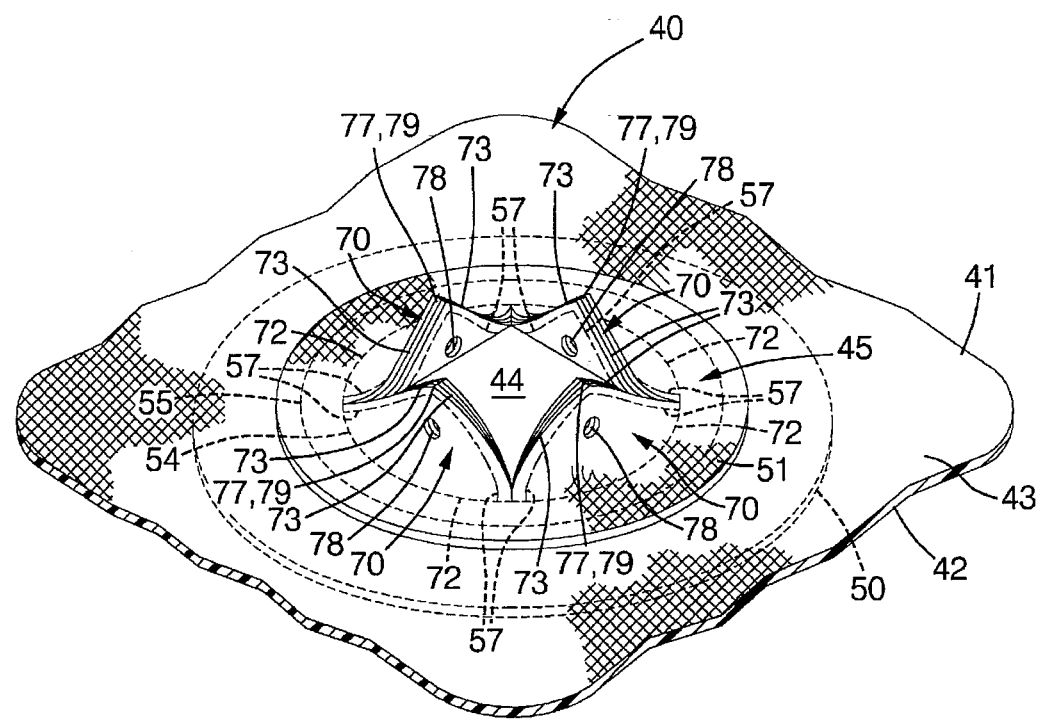
FIG. 3D shows the air bag with the flap portions folded back to reveal the air bag opening.

The air bag 40 is also provided with a first cut 82 and a second cut 83 to form the air bag opening 44 and the flap portions 70. The cuts 82, 83 are preferably linear and of equal length and are preferably perpendicular to each other and intersect each other at their centers. The cuts 82, 83 are located between the edge seams 57 of the flap portions 70 and extend across a diameter of the air bag opening 44 to a location just within the inner seam 54 so that cuts 82, 83 do not cross the inner seam 54. It will be appreciated that the first and second cuts 82, 83 cooperatively form the air bag opening 44 and simultaneously form the flap portions 70. Referring to FIG. 3D, each of the flap portions 70 are then free to be folded radially outward towards the exterior side 43 of the air bag 40 to reveal the circular air bag opening 44 formed by the cuts 82, 83. The remainder of the air bag material may be suitably sewn together to form the air bag 40.

The air bag module 20 is preferably assembled as follows. The fasteners 10 are attached to the base plate 24 such that the shank portions 12 of the fasteners 10 project downwardly away from the bottom surface 29 of the base plate 24. The upper surface 28 of the base plate 24 is laid atop the exterior side 43 of the mouth portion 45 of the air bag 40 such that the base plate opening 26 is approximately aligned with the inner seam 54 and such that the flap portions 70 extend radially inward towards a center of the base plate opening 26. Next, each of the flap portions 70, including the sewn together air bag material, interior and exterior reinforcement patch layers 50, 51, are pulled away from the upper surface 28 of the base plate 24, through the base plate opening 26 and folded back along the first edges 72 such that the tip portions 77 are adjacent the bottom surface 29 of the base plate 24. The flap apertures 78 are aligned with the shank portions 12 of the fasteners 10 and the shank portions 12 are pushed through the respective flap apertures 78 to loosely attach the tip portions 77 of the flap portions 70 to the bottom surface 29 of the base plate 24. The inflatable main body portion 41 of the air bag 40 is folded either before or after attachment of the flap portions 70 to the fasteners 10.

Next, with the module 20 in the inverted position shown in FIG. 1, the flange apertures 68 of the tabs of the inflator flange 66 are each aligned with respective fasteners 10 on the bottom surface 29 of the base plate 24 as shown in FIG. 1. The inflator 60 is inserted through the base plate opening 26 from the bottom surface 29 of the base plate 24 such that the upper outlet portion 62 of the inflator 60 extends away from the upper surface 28 of the base plate 24. It is desirable to have the inflator 60 be the last component assembled to the module 20 for ease of assembly. The shank portions 12 of the fasteners 10 are received within the flange apertures 68 and insertion of the inflator 60 through the base plate opening 26 is limited by the inflator flange 66. Finally, the inflator 60 and flap portions 70 of the mouth portion 45 of the air bag 40 are suitably secured to the base plate 24, such as by the fasteners 10 and corresponding nuts 11 secured to the shank portions 12. A cover (not shown) may be attached to the base plate 24 and wrapped around the air bag 40 and inflator 60 to maintain the air bag 40 in the folded condition prior to deployment. The entire module 20 may then be suitably mounted to the hub portion of the steering wheel.

In the assembled condition shown in FIG. 2, the air bag 40 is securely anchored to the base plate 24 of the module 20 by the flap portions 70 and is held in position relative to the base plate 24 during the forces associated with air bag inflation by the flap portions 70. It will further be appreciated that the air bag 40 is advantageously attached directly to the base plate 24 without the use of a structural air bag retainer. Also advantageously, the flap portions 70 extend through the base plate opening 26 for secure attachment to the bottom surface 29 of the base plate 24. Thus, the flap portions 70 of the mouth portion 45 are captured between the inflator flange 66 and the bottom surface 29 of the base plate 24, instead of being captured between the upper surface 28 of the base plate 24 and a separate air bag retainer as in the prior art. In addition, the flap portions 70 are also captured between the wall of the base plate opening 26 and the inflator 60. The interior reinforcement patch layer 50 is positioned adjacent the inflator 60 during air bag inflation as shown in FIG. 2. Thus, the interior reinforcement patch layer 50 is preferably made of a heat resistant fabric. It will further be appreciated that the flap portions 70 provide a strong secure anchor for the air bag 40 since they are a continuous extension of the air bag material.

Upon actuation, the inflator 60 discharges inflator gas. The ports 64 of the inflator 60 direct the discharging inflator gas upwardly to inflate the air bag 40 which will deploy upwardly and break open the cover in a well-known manner. During the application of forces associated with air bag inflation, the flap portions 70 are securely attached to the base plate 24 by the fasteners 10 and hold the air bag 40 in position relative the base plate 24 without the use of an air bag retainer. The air bag 40 will not release from the base plate 24 during deployment since the flap portions 70 are a continuous extension of the air bag material and also include the reinforcement patch layers 50, 51. Advantageously, there is no need for a metal or plastic air bag retainer to reinforce the mouth portion 45 of the air bag 40 and no need to sandwich the air bag 40 between an air bag retainer and the base plate 24 since the flap portions 70 extend through the plate opening 26 for attachment to the bottom surface 29 of the base plate 24. It will further be appreciated that the same fasteners 10 that are used to attach the inflator 60 to the base plate 24 are also used to attach the flap portions 70 to the base plate 24. Since an air bag retainer and extra fasteners attaching the air bag to the air bag retainer and the air bag to the inflator are eliminated, the module 20 is lighter, less expensive and easier to assemble than prior modules.

It will be understood that a person skilled in the art may make modifications to the preferred embodiment shown herein within the scope and intent of the claims. Although the preferred embodiment shows a generally rectangular base plate 24, a circular plate opening 26, and a circular air bag opening 44, the base plate 24, plate opening 26, and air bag opening 44 may be many other geometric shapes, such as circular, square, rectangular, hexagonal or others. Although the preferred embodiment shows interior and exterior reinforcement patch layers 50, 51, it will further be appreciated that none, one, or more than one reinforcement patch layers may also be utilized depending on the strength of the fabric air bag material, strength of the reinforcement material, and the force of the discharging inflator gas. Although the preferred embodiment shows four flap portions 70, it will be appreciated that the mouth portion 45 of the air bag extending radially inward from the air bag opening 44 may also be cut into more or less than four flap portions 70 depending on the geometric shape of the air bag opening 44 and the desired number of flap portions 70 for attachment to the base plate 24.

While the present invention has been described as carded out in a specific embodiment thereof, it is not intended to be limited thereby but is intended to cover the invention broadly within the scope and spirit of the claims.

What is claimed is:

1. A method of attaching an air bag to an air bag module, the module including an inflator for discharging inflator gas to inflate the air bag, the method comprising the steps of:

providing the air bag made of a flexible fabric air bag material;

cutting the air bag material into flap portions which cooperatively form the shape of an air bag opening for receiving inflator gas therethrough;

folding back the flap portions to open the air bag opening;

fastening the flap portions to the module; and sewing a seam around a perimeter of each of the flap portions prior to cutting the air bag material into flap portions.

2. The method of claim 1 further comprising the step of:

cutting the air bag into flap portions by providing at least two intersecting linear cuts in the air bag material.

3. The method of claim 1 further comprising the steps of:

providing an aperture in each of the flap portions; and fastening the flap portions to the module via the apertures.

4. The method of claim 1 further comprising the steps of:

providing a base plate;

providing the inflator with an outwardly extending inflator flange; inserting the flap portions between the base plate and the inflator flange; and fastening the flap portions and inflator flange to the base plate.

5. The method of claim 1 further comprising the steps of:

providing a reinforcement patch layer sized larger than the air bag opening;

attaching the reinforcement patch layer to the air bag prior to cutting the air bag material into flap portions; and simultaneously cutting the reinforcement patch layer and the air bag material into the flap portions.

6. The method of claim 5 further comprising the step of:

sewing a seam around a perimeter of each of the flap portions through both the reinforcement patch layer and the air bag material prior to cutting the air bag.

7. The method of claim 1 further comprising the steps of:

providing a base plate having a base plate opening, an upper surface and an opposite bottom surface;

providing the air bag with an inflatable main body portion positioned atop the upper surface of the base plate; and pulling the flap portions at least partially through the base plate opening and attaching the flap portions to the bottom surface of the base plate.

8. A method of attaching an air bag to an air bag module, the module including an inflator for discharging inflator gas to inflate the air bag, the method comprising the steps of:

providing the air bag made of a flexible fabric air bag material;

cutting the air bag material into flap portions which cooperatively form the shape of an air bag opening for receiving inflator gas therethrough;

folding back the flap portions to open the air bag opening;

fastening the flap portions to the module;

providing a reinforcement patch layer sized larger than the air bag opening;

attaching the reinforcement patch layer to the air bag prior to cutting the air bag material into flap portions;

simultaneously cutting the reinforcement patch layer and the air bag material into the flap portions; and sewing a seam around a perimeter of each of the flap portions through both the reinforcement patch layer and the air bag material prior to cutting the air bag material into flap portions.

* * * * *